HYDRAULICALLY OPERATED LOAD HANDLING SYSTEM FOR TRUCKS

Filed April 28, 1955

12 Sheets-Sheet 1

INVENTORS

Harvey Lester Haverstick,

Henry Chester Haverstick,

BY John B. Brady

ATTORNEY

HYDRAULICALLY OPERATED LOAD HANDLING SYSTEM FOR TRUCKS

INVENTORS
Harvey Lester Haverstick,
Henry Chester Haverstick,
BY
John B. Brady
ATTORNEY June 19, 1956 H. L. HAVERSTICK ET AL 2,751,095

HYDRAULICALLY OPERATED LOAD HANDLING SYSTEM FOR TRUCKS

Filed April 28, 1955 12 Sheets-Sheet 3

INVENTORS
Harvey Lester Haverstick,
Henry Chester Haverstick,
BY
John B. Brady
ATTORNEY

HYDRAULICALLY OPERATED LOAD HANDLING SYSTEM FOR TRUCKS

Filed April 28, 1955

INVENTORS
Harvey Lester Haverstick
Henry Chester Haverstick,
BY
John B. Brady
ATTORNEY June 19, 1956 H. L. HAVERSTICK ET AL 2,751,095

HYDRAULICALLY OPERATED LOAD HANDLING SYSTEM FOR TRUCKS

Filed April 28, 1955 12 Sheets-Sheet 5

INVENTORS

Harvey Lester Haverstick,

Henry Chester Haverstick,

BY John B. Brady

ATTORNEY

INVENTORS
Harvey Lester Haverstick,
Henry Chester Haverstick,
BY
John B. Brady
ATTORNEY June 19, 1956 H. L. HAVERSTICK ET AL 2,751,095

HYDRAULICALLY OPERATED LOAD HANDLING SYSTEM FOR TRUCKS

Filed April 28, 1955 12 Sheets-Sheet 7

INVENTORS

Harvey Lester Haverstick,
Henry Chester Haverstick,
BY
John B. Brady
ATTORNEY

June 19, 1956 H. L. HAVERSTICK ET AL 2,751,095

HYDRAULICALLY OPERATED LOAD HANDLING SYSTEM FOR TRUCKS

Filed April 28, 1955 12 Sheets-Sheet 8

INVENTORS

Harvey Lester Haverstick,

Henry Chester Haverstick,

BY

John B. Brady

ATTORNEY

HYDRAULICALLY OPERATED LOAD HANDLING SYSTEM FOR TRUCKS

INVENTORS
Harvey Lester Haverstick,
Henry Chester Haverstick,
BY
John B. Brady
ATTORNEY June 19, 1956 H. L. HAVERSTICK ET AL 2,751,095

HYDRAULICALLY OPERATED LOAD HANDLING SYSTEM FOR TRUCKS

Filed April 28, 1955 12 Sheets-Sheet 10

INVENTORS

Harvey Lester Haverstick,

Henry Chester Haverstick,

BY

John B. Brady

ATTORNEY

June 19, 1956 H. L. HAVERSTICK ET AL 2,751,095

HYDRAULICALLY OPERATED LOAD HANDLING SYSTEM FOR TRUCKS

Filed April 28, 1955 12 Sheets-Sheet 11

INVENTORS
Harvey Lester Haverstick,
Henry Chester Haverstick,
BY John B. Brady
ATTORNEY

HYDRAULICALLY OPERATED LOAD HANDLING SYSTEM FOR TRUCKS

INVENTORS

Harvey Lester Haverstick,
Henry Chester Haverstick,
BY John B. Brady
ATTORNEY

United States Patent Office 2,751,095

Patented June 19, 1956

2,751,095

HYDRAULICALLY OPERATED LOAD HANDLING SYSTEM FOR TRUCKS

Harvey Lester Haverstick, Manheim, and Henry Chester Haverstick, Lancaster, Pa.

Application April 28, 1955, Serial No. 504,489

6 Claims. (Cl. 214—75)

Our invention relates broadly to loading and unloading equipment and more particularly to a hydraulically operated loader and unloader for trucks.

One of the objects of our invention is to provide a hydraulically operated loading and unloading mechanism for trucks in which a carriage is hydraulically propelled from one end of the truck to the other and provided with hydraulically controlled load elevating and lowering mechanism for moving, or raising or lowering a load with respect to the truck.

Another object of our invention is to provide an arrangement of loading and unloading mechanism for trucks which may be controlled by the truck driver, reducing the labor heretofore required in heavy loading and unloading operations.

Still another object of our invention is to provide a construction of hydraulically controlled loading and unloading mechanism for trucks in which a carriage is longitudinally movable along a rail system carried by the truck for shifting a load longitudinally of the truck and wherein the carriage system supports a hydraulic cylinder and piston assembly extending transversely of the truck and which controls a load supporting cable system operative over an arrangement of pulleys, whereby a load may be raised and lowered with respect to the truck for loading and unloading the truck.

Still another object of our invention is to provide a telescopically slidable hinged connection between a longitudinally movable carriage and the frame structure of a truck whereby a hydraulic pressure feed hose may be supported in a position connecting hydraulic pump mechanism with a hydraulic elevator mechanism mounted on the carriage for raising and lowering a load while the carriage may be moving with respect to the truck.

Other and further objects of our invention reside in an arrangement for continuously feeding a hydraulic elevator mounted on a traveling carriage movable over the top of a truck for loading and unloading the truck under convenient hydraulic control as set forth more fully in the specification hereinafter following by reference to the accompanying drawings, in which:

Fig. 3 is a foreshortened side elevational view on an enlarged scale showing the hydraulic loading mechanism moved to the rear end of the truck preparatory for a loading operation, the view being taken from the opposite side of the truck with respect to the view of Fig. 1;

Figure 1:
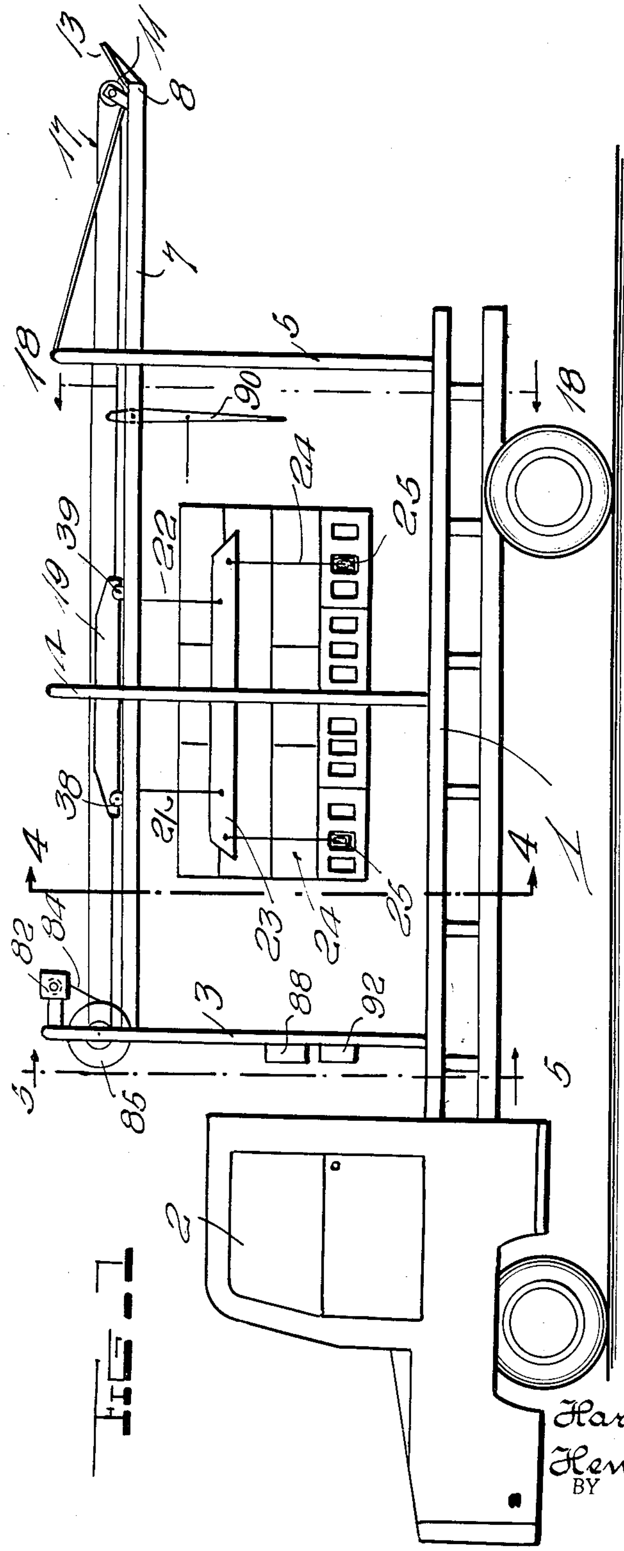
Fig. 1 is a side elevational view of a truck equipped with the hydraulically operated loading and unloading mechanism of our invention.
Figures 5, 12, 13:
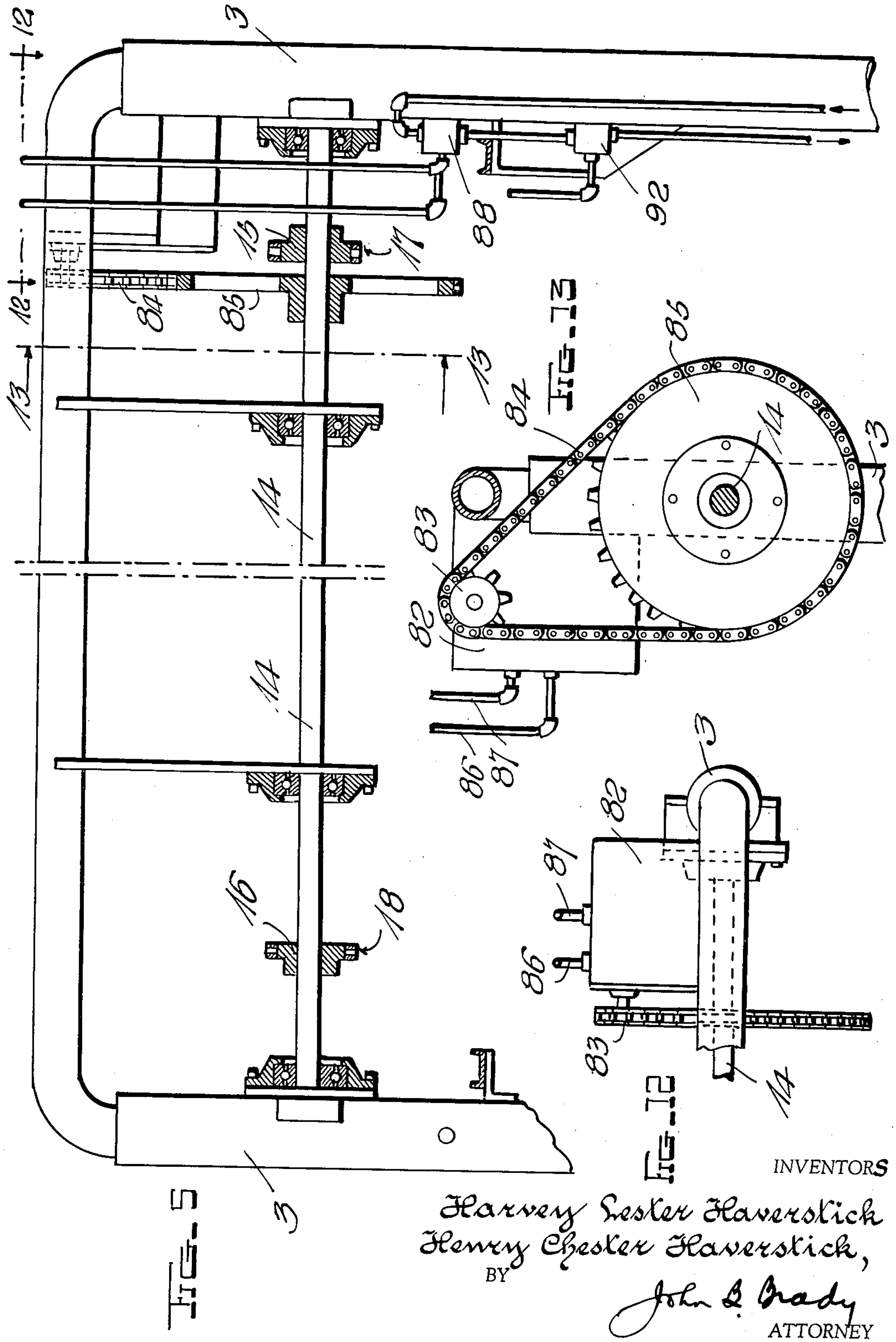
Fig. 5 is a transverse sectional view taken substantially on line 5—5 of Fig. 1.
Figures 6, 17:
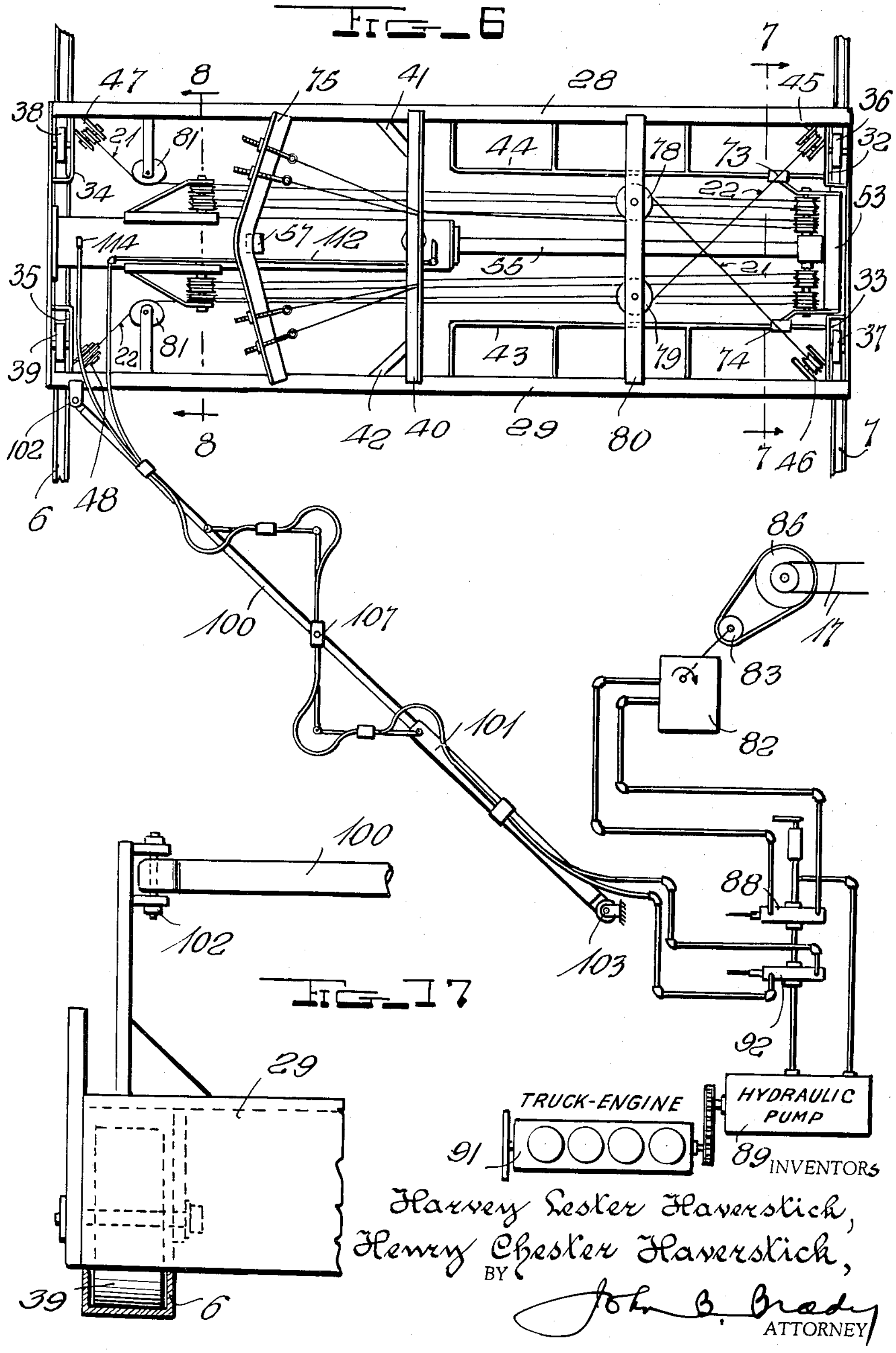
Fig. 6 is a top plan view of the traveling carriage illustrating the manner in which the carriage operates longitudinally of the truck while connected through hydraulic pressure feed means to the hydraulic pump driven by the truck engine, the view illustrating the position of the elevator mechanism with the load in raised position.
Figures 6A, 22, 23:
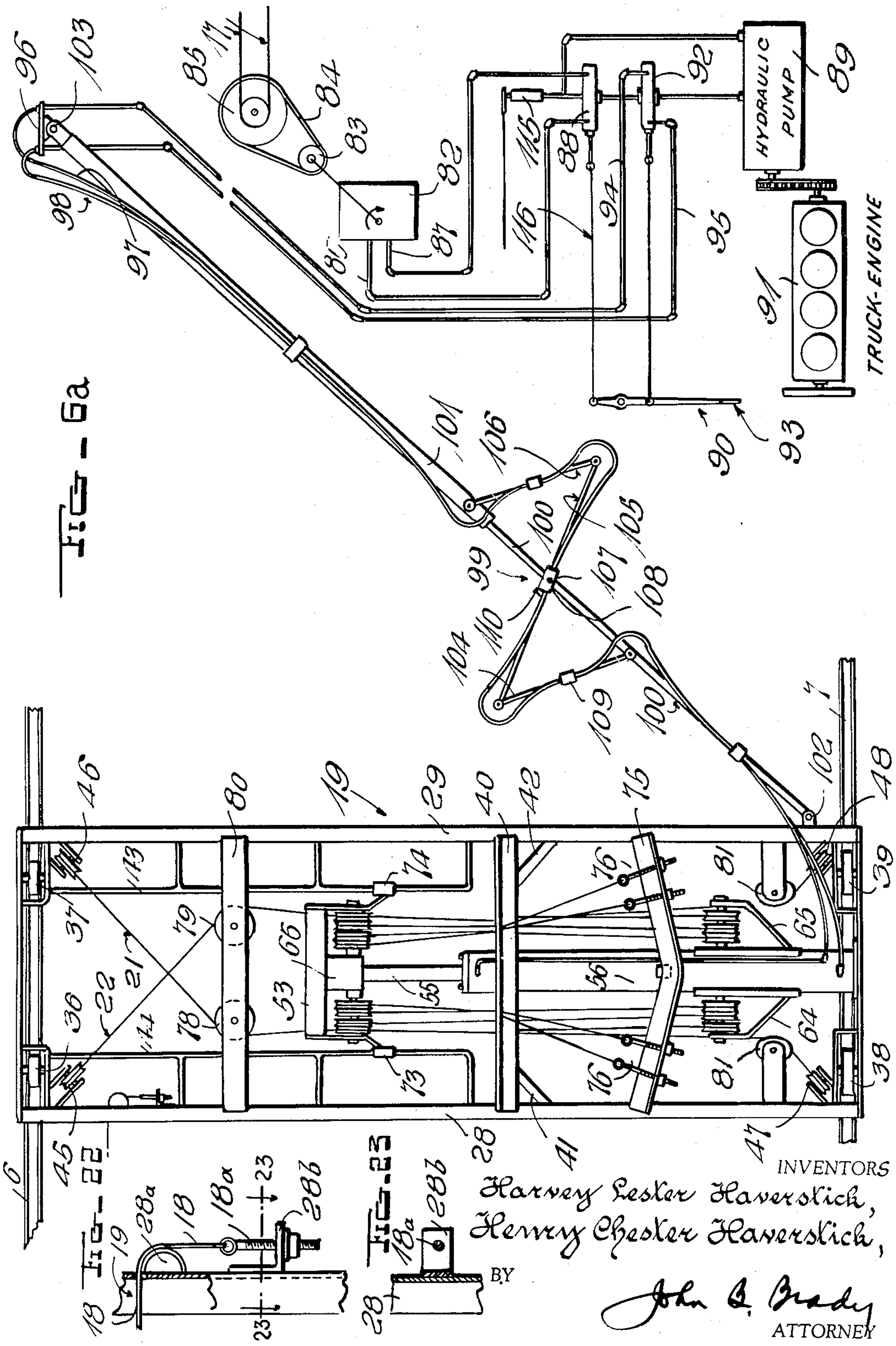
Figures 7, 11:
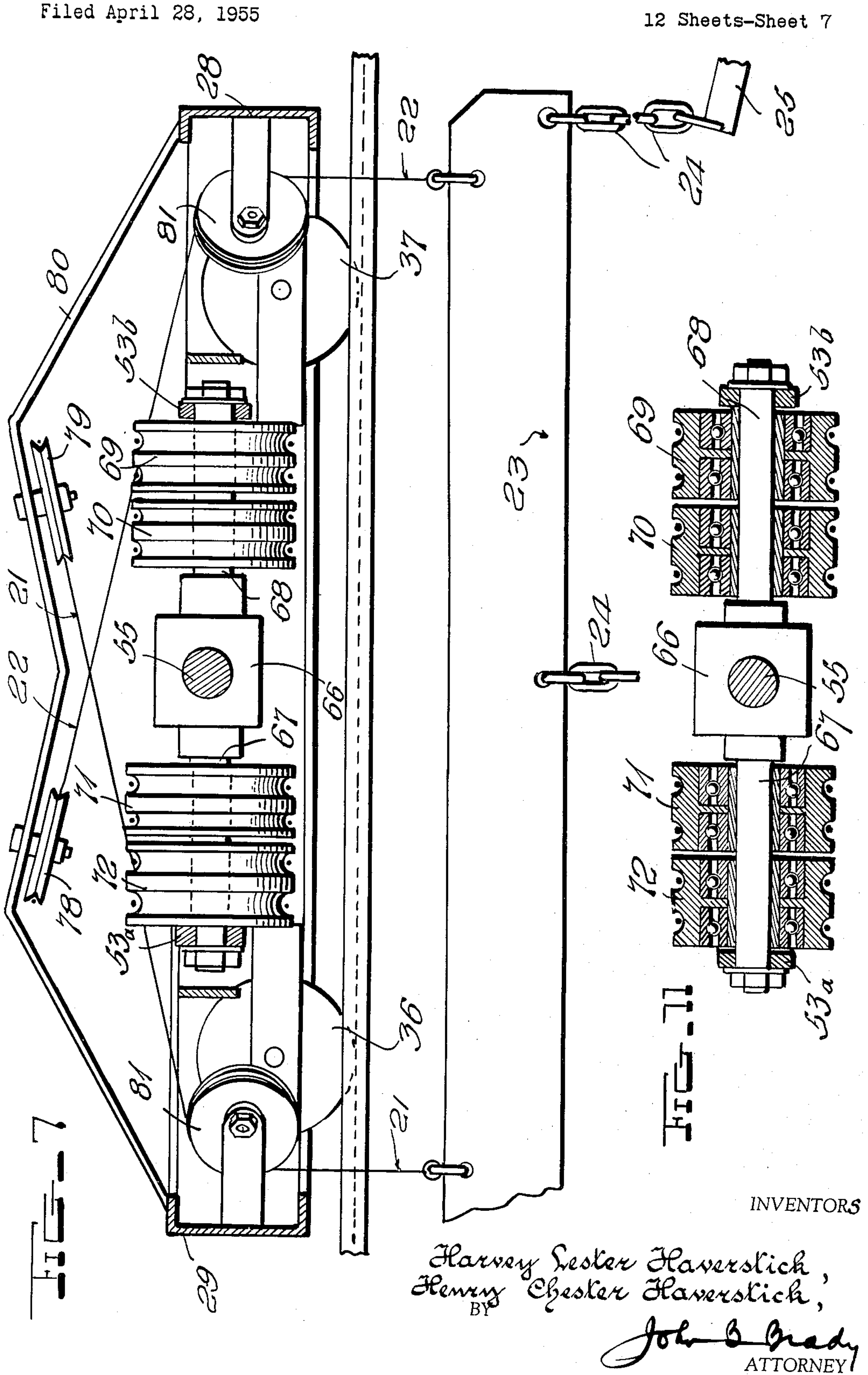
Figure 8:
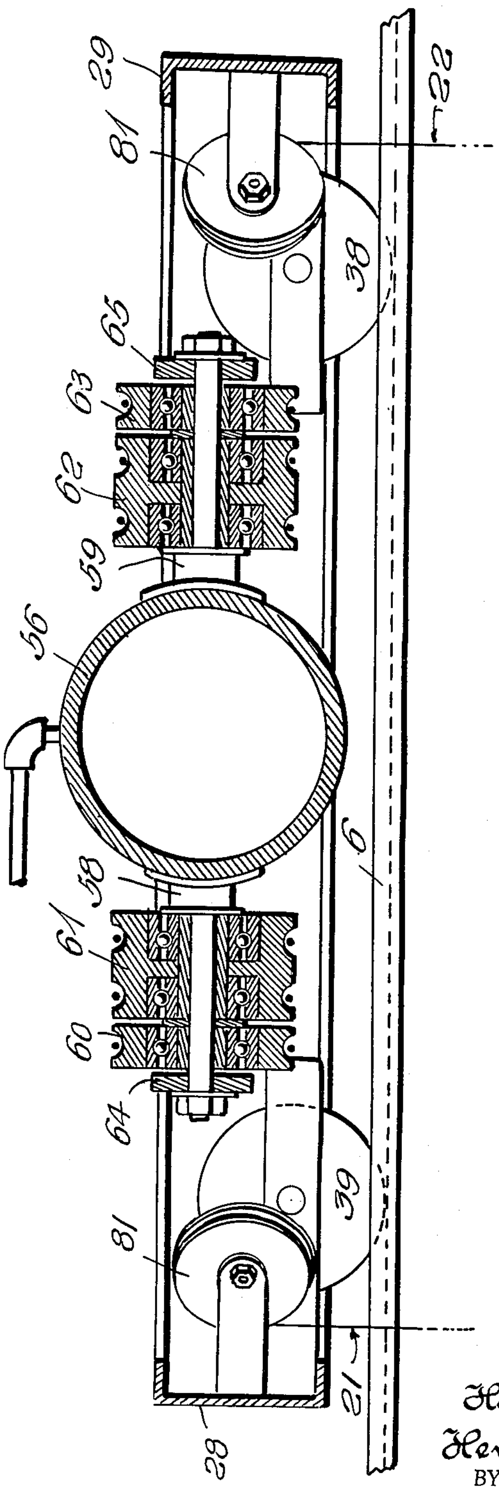
Figure 9:
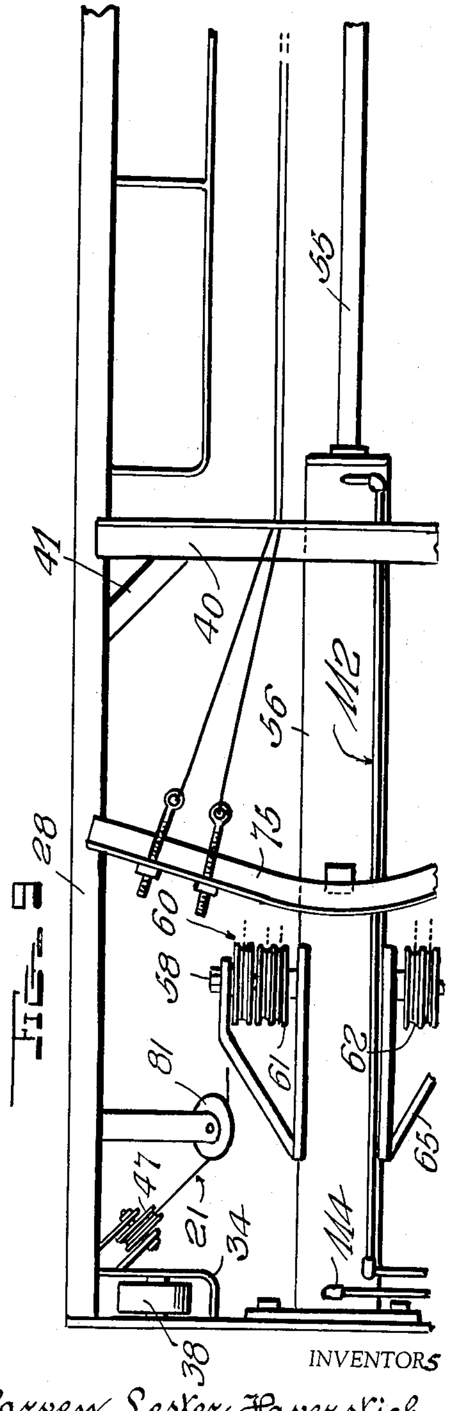
Figure 10:
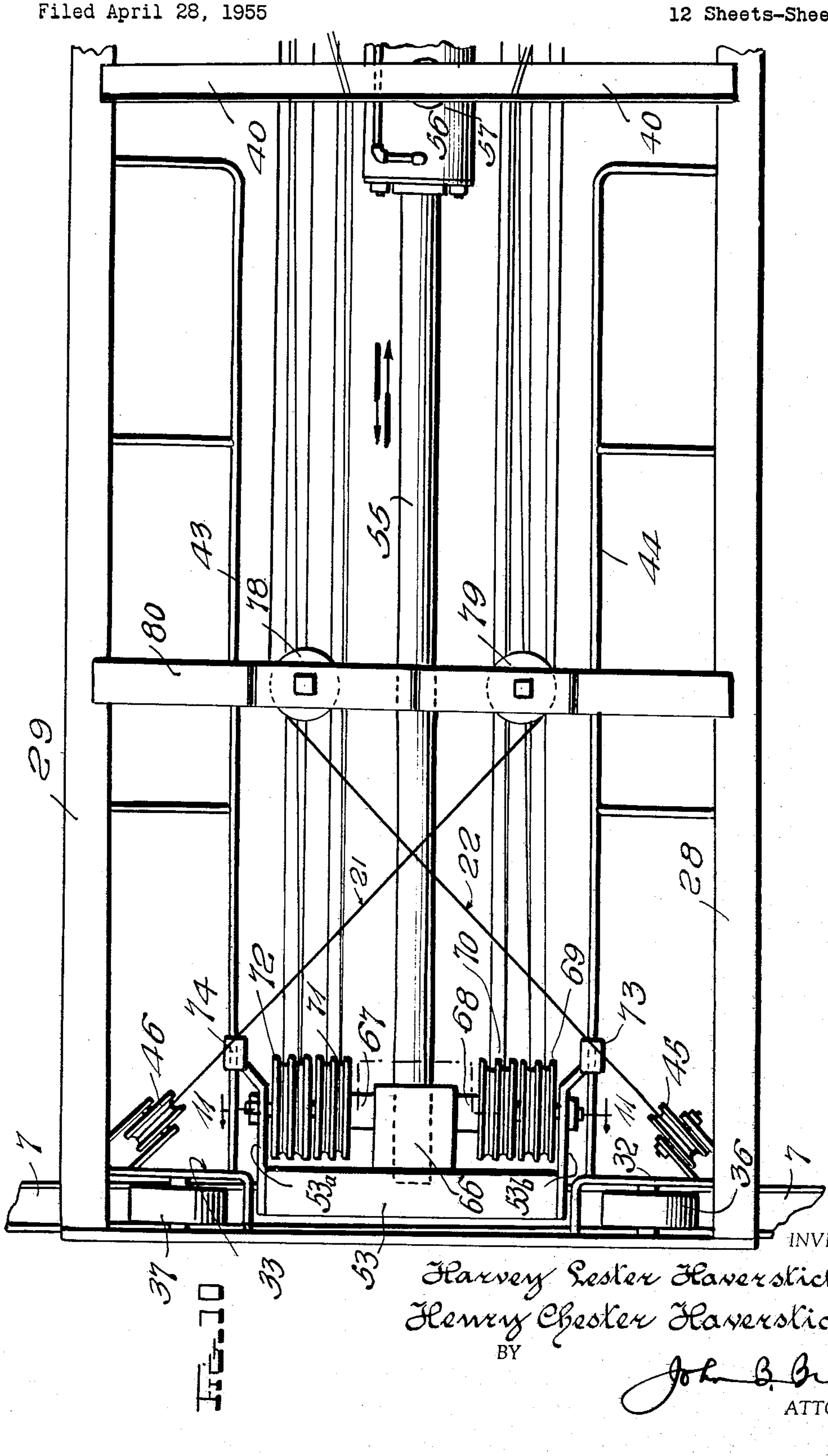
Figures 14, 15, 16:
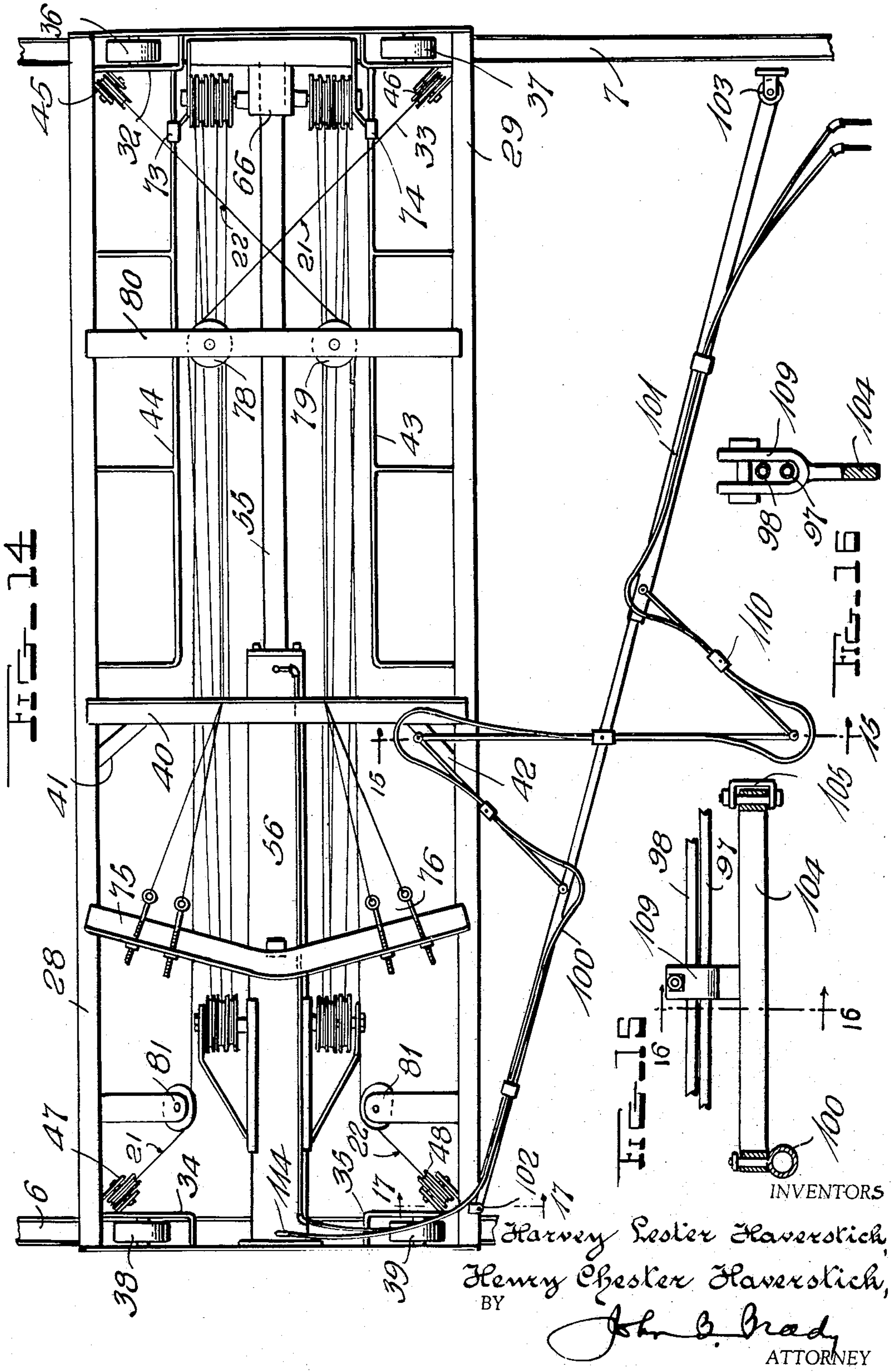
Figures 18, 19, 20, 21:
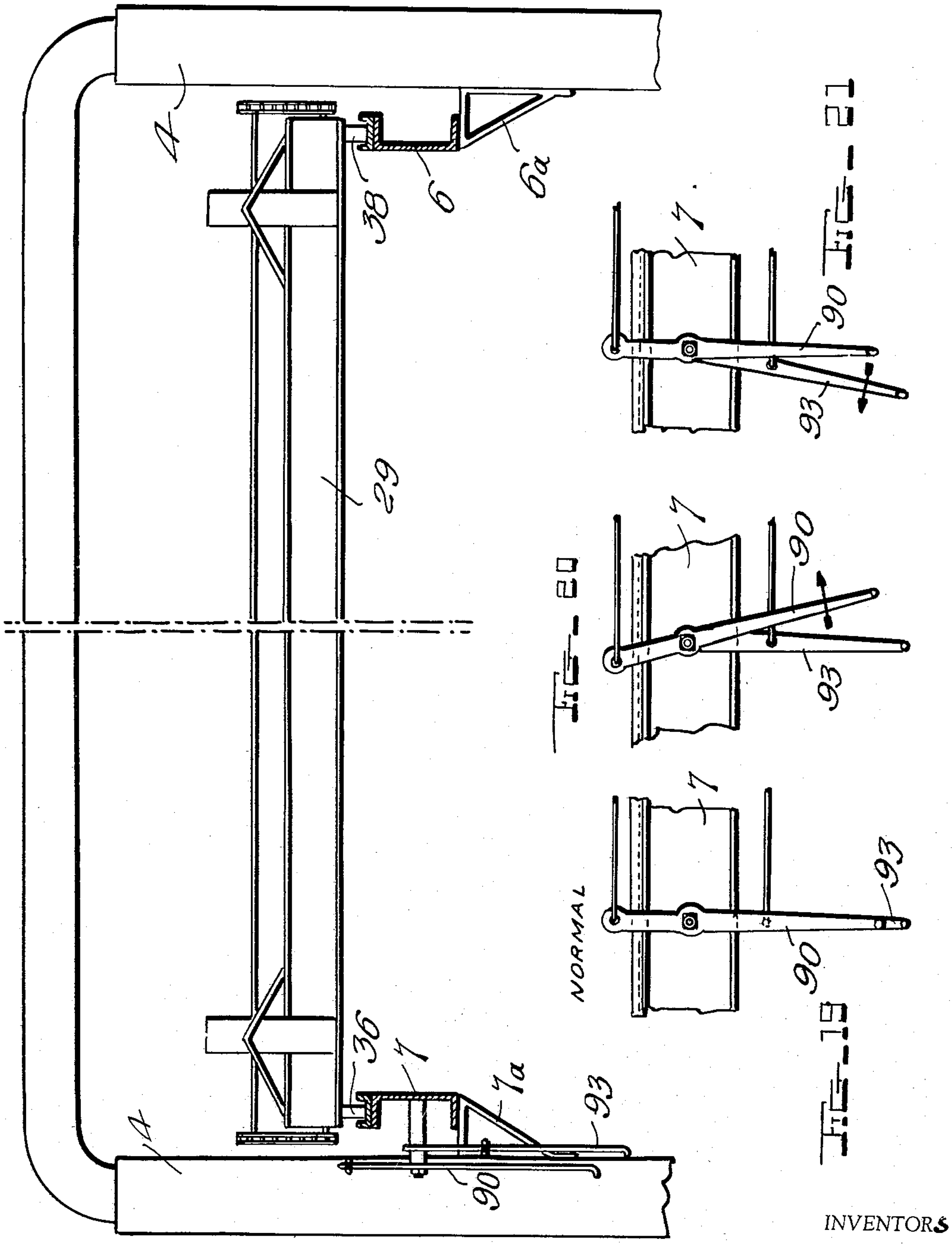
Figures 24, 25, 26:
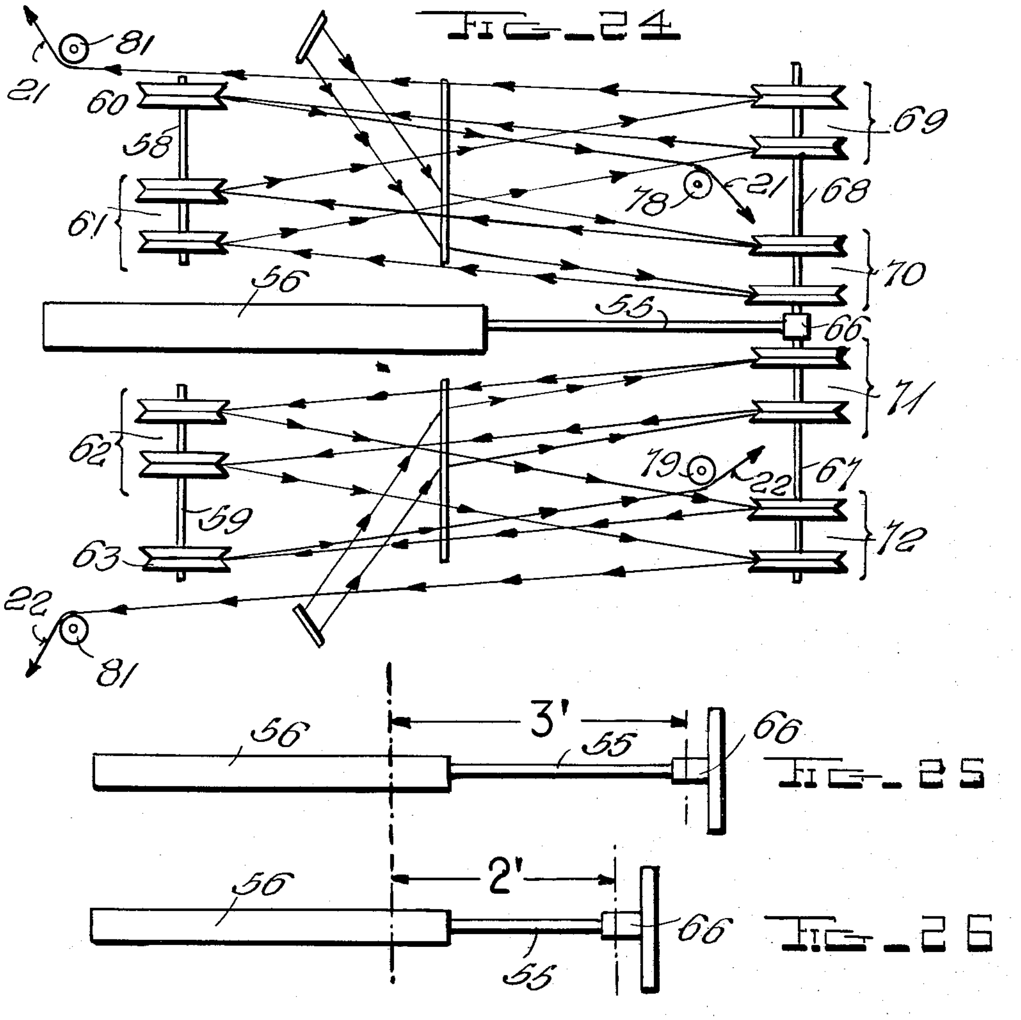
Figure 27:
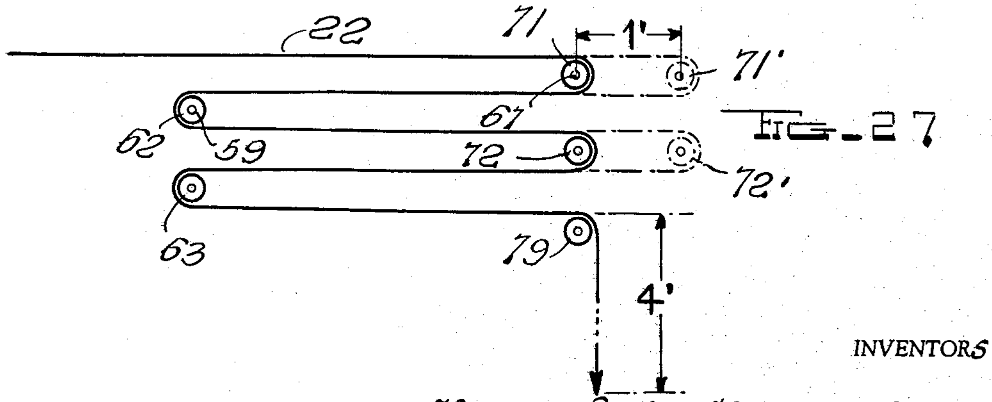

Fig. 6*a* is a view similar to the view shown in Fig. 6 but illustrating the position of the elevator with the load in lowered position;

Fig. 7 is an enlarged transverse sectional view taken substantially on line 7—7 of Fig. 6;

Fig. 8 is an enlarged transverse sectional view taken substantially on line 8—8 of Fig. 6;

Fig. 9 is a fragmentary plan view on an enlarged scale of the upper left hand portion of the carriage and hydraulic elevator mechanism illustrated in Fig. 6, the view being partially broken away and shown in section;

Fig. 10 is an enlarged fragmentary plan view of the translatory head portion of the traveling carriage shown in Fig. 6 and illustrating particularly the hydraulic piston rod of the elevator mechanism, the header carried thereby and the shoes connected with the header and slidably engaging the guide rails on the carriage for maintaining the operation of the hydraulic piston rod in a lineal path with respect to the hydraulic cylinder assembly;

Fig. 11 is a transverse sectional view taken through the pulley assembly carried by the header of the piston rod of the hydraulic elevator as on line 11—11 of Fig. 10;

Fig. 12 is a top plan view showing the hydraulic drive mechanism for moving the traveling carriage longitudinally of the truck, the view being taken substantially on line 12—12 of Fig. 5;

Fig. 13 is a vertical sectional view of the carriage drive mechanism taken substantially on line 13—13 of Fig. 5 and illustrating the hydraulic carriage drive mechanism in side elevation;

Fig. 14 is an enlarged plan view of the traveling carriage shown in Figs. 6 and 6*a*;

Fig. 15 is a transverse sectional view on line 15—15 of Fig. 14 showing the angularly movable support for supplying oil to the traveling carriage;

Fig. 16, sectional view on line 16—16 of Fig. 15;

Fig. 17 is an enlarged vertical sectional view taken on line 17—17 of Fig. 14 showing the pivotal mounting for the flexible hose support on the traveling carriage;

Fig. 18 is a fragmentary vertical sectional view on line 18—18 of Fig. 1;

Fig. 19 shows the normal position of the hand control levers for governing the movement of the carriage and the raising and lowering of the elevator;

Fig. 20 is a view of the hand control levers of Fig. 19 moved to one of the control positions thereof;

Fig. 21 is a view of the hand control levers moved to an opposite controlling position;

Fig. 22 is an enlarged plan view partially in section showing one of the adjustment means for the cable which controls the longitudinal movement of the traveling carriage with respect to the truck;

Fig. 23 is a transverse sectional view on line 23—23 of Fig. 22;

Fig. 24 is a theoretical view showing the layout of cables through the pulleys of the elevator mechanism;

Fig. 25 is a schematic view showing the relative position of the pulleys in the elevator mechanism with the hydraulic piston shown in the extended position for maintaining the load in elevated position;

Fig. 26 is a schematic view similar to Fig. 25 except that the hydraulic piston is shown in a somewhat retracted position for lowering the load; and Fig. 27 is a diagrammatic view showing the layout of the cable with reference to the pulleys for illustrating the load raising or lowering advantage, whereby a change in position of the load to the extent of four feet, for example, occurs for displacement of the piston in the hydraulic cylinder, to the extent of one foot.

Our invention is directed to a compact construction of hydraulic loading and unloading equipment for trucks by which a traveling carriage may be moved along the top of a truck under hydraulic control and a hydraulic elevator mechanism on the carriage operated to control a cable system by which a load may be raised or lowered and moved with respect to the truck. The rail system on which the traveling carriage moves extends beyond the end of the truck so that pick-up can be conveniently made of a load piled on the ground and against which the truck may be backed. The hydraulic elevator on the carriage is then activated for elevating the load to a position just above the plane of the floor of the truck. The traveling carriage is then hydraulically propelled toward the front of the truck and the load released. The operation is repeated for subsequent loads until the truck is fully loaded. The unloading operation consists in activation of the hydraulic elevator for raising the load from the truck in a position suspended beneath the carriage. The carriage is then hydraulically propelled to a position beyond the end of the truck and the load hydraulically lowered to the ground. All of these operations may be performed by one individual without the necessity of additional labor costs. The traveling carriage is moved longitudinally of the truck by a hydraulic motor selectively controlled. The elevator mechanism consists of a compact hydraulic cylinder and piston assembly which operates a cable system over a pulley assembly for elevating and lowering the load. The hydraulic control mechanism is so arranged that the traveling carriage may be started and stopped in any position with respect to the truck and the load may be elevated and lowered through a range adequate to clear the bottom of the truck and to enable the load to be picked up or delivered to ground level at the rear of the truck.

Particular features of our invention comprise the manner of delivery of hydraulic pressure to the hydraulic elevator on the moving carriage; the guiding of the elevator mechanism so that adequate support is assured at all times against excessive stresses through a system of lineally disposed guide rails and co-acting slidable shoes; adjustment is provided for the cable system to assure the proper tolerances for the longitudinal travel of the carriage and for the vertical raising and lowering of the load; and the arrangement of the hydraulic drive mechanism for controlling both the longitudinal movement of the carriage and for the raising and lowering of the load.

Figure 4:
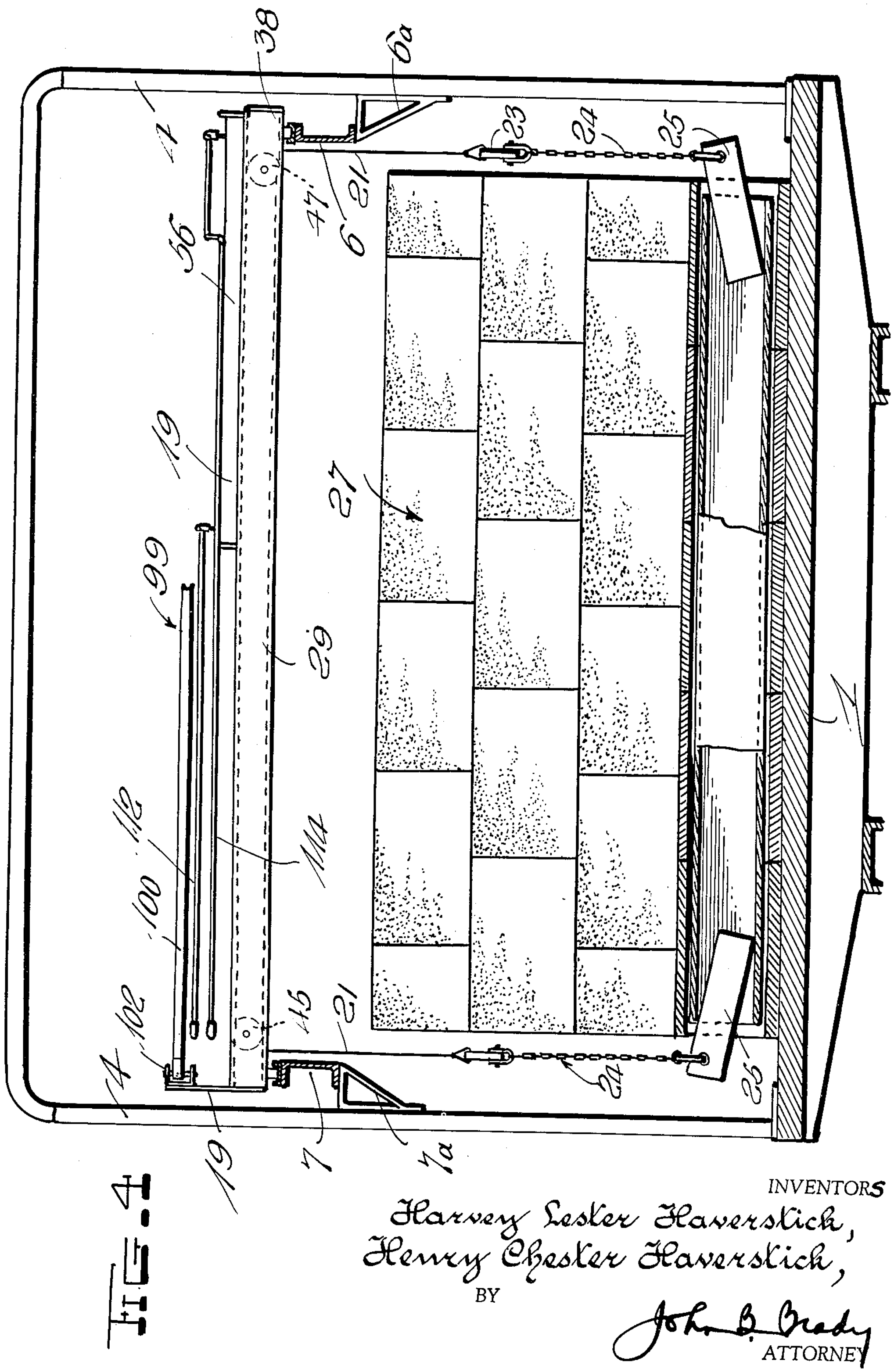
Fig. 4 is a transverse sectional view taken substantially on line 4—4 of Fig. 1.

Referring to the drawings in detail reference character 1 designates the truck body of a vehicle equipped with the loading and unloading mechanism of our invention including the cab 2 and the vertical frames 3, 4 and 5 distributed along the chassis. The vertical frames 3, 4 and 5 support longitudinally extending rails 6 and 7 on suitable brackets such as *6a* and *7a* illustrated in Fig. 4. The rails 6 and 7 are interconnected by a transverse end frame member 8 which carry the brackets 9 and 10 in which sprockets 11 and 12 are journaled. A guard 13 is associated with the end of each of the longitudinally extending rails 6 and 7.

Figure 2:
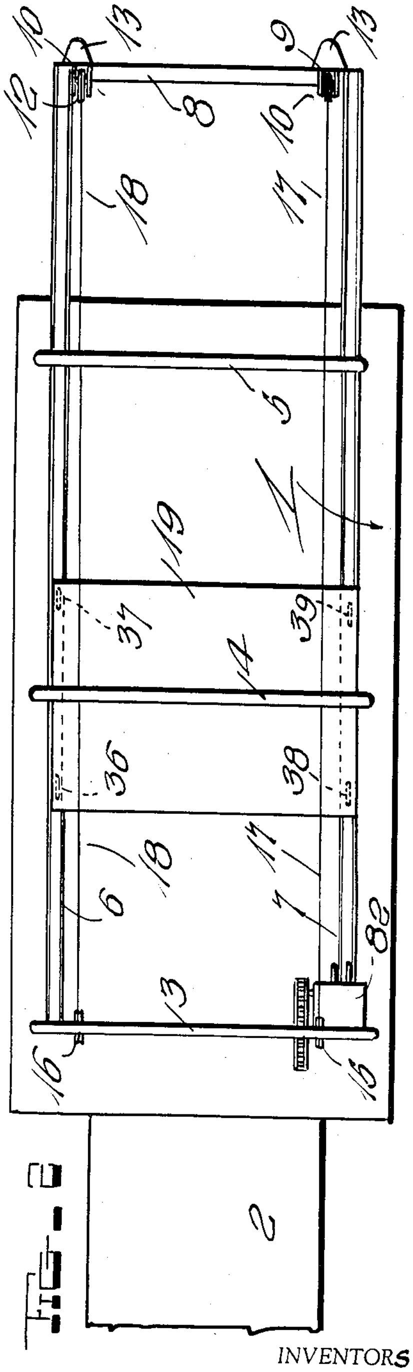
Fig. 2 is a top plan view showing the arrangement of the traveling carriage on the rail system of the truck.
Figure 2:
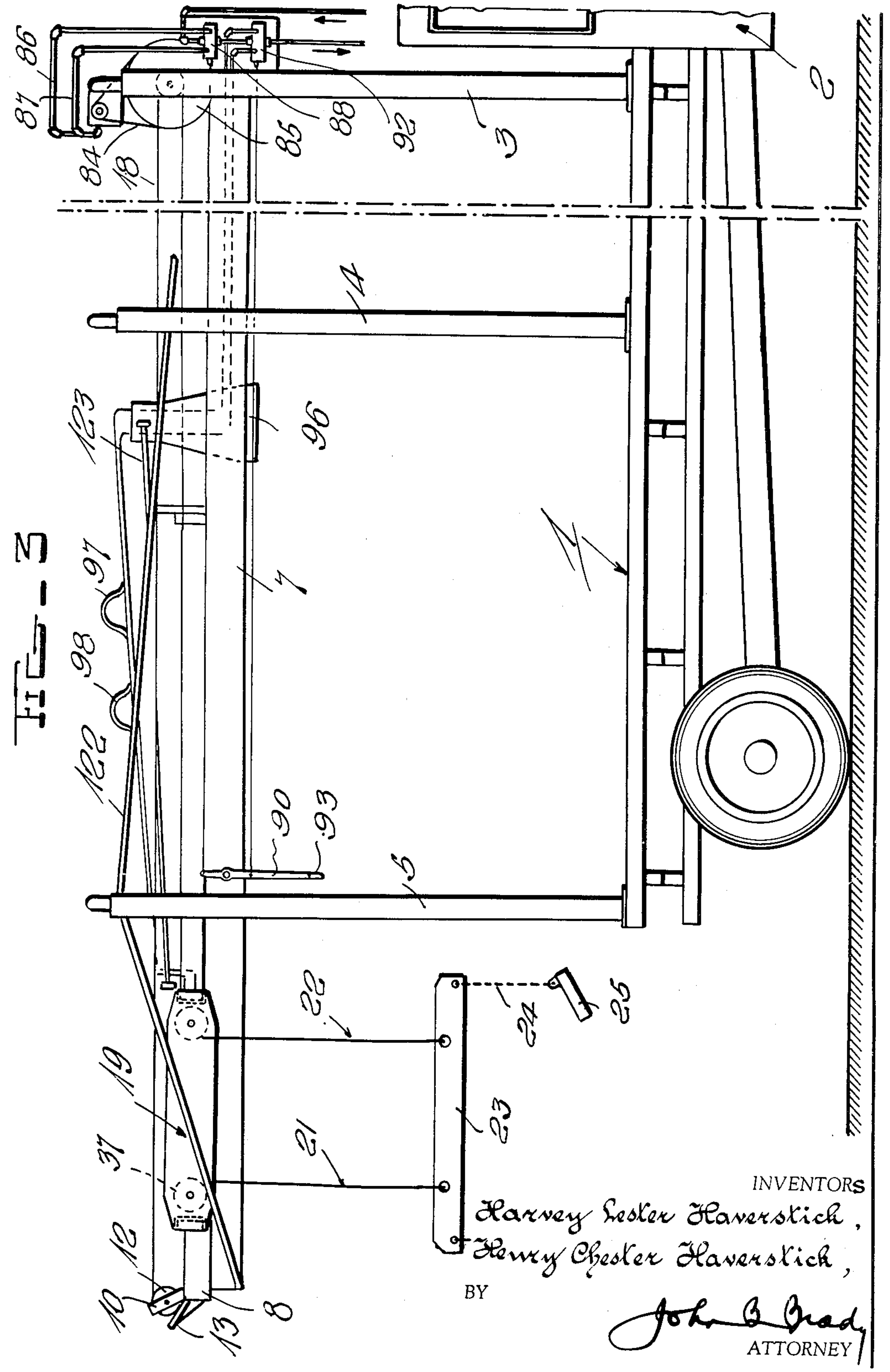

A front shaft 14 is journaled between opposite sides of the vertical frame 3 and carries sprockets 15 and 16 longitudinally aligned with the sprockets 11 and 12, respectively, as shown more clearly in Fig. 2. These sprocket wheels guide sprocket chains 17 and 18 which are secured at their lower ends to the carriage 19 and pass over the carriage 19 at their upper levels. The sprocket chains 17 and 18 are fastened at one transverse side of the carriage 19 as shown more clearly in Figs. 6, *6a*, 10, 15 and 16. The carriage 19 consists of transverse frame members 28 and 29 interconnected at their remote ends by the longitudinally extending frame members 30 and 31. The sprocket chains 17 and 18 pass through apertures in transverse frame 28, as represented more clearly in Figs. 22 and 23, and around the curved guide 28a and are secured to an adjustable screw-threaded member 18a fastened to sprocket chain 18. The screw-threaded member 18a is adjustable in bracket 28b supported on transverse frame member 28 in such manner that the existing slack is taken out of the sprocket chain to insure precision movement of carriage 19. The sprocket chain 17 is similarly tensioned so that there is minimum lost motion in the operation of the carriage 19 as it moves longitudinally along rails 6 and 7. Movement is imparted to sprocket chains 17 and 18 by a hydraulically operated motor system shown more particularly in Figs. 5, 12 and 13, and which will be described in more detail hereinafter.

The traveling carriage 19 is shown in Figs. 1, 2, 3, 4, 6, *6a*, 7, 8 and 9 as provided with lift cables 21 and 22 extending from the carriage 19 and connected with a lift bar 23 to which is connected the supporting chains 24 which connect to lift pins 25. The lift pins 25 project through the passages in the blocks 27 for raising and lowering the blocks en masse.

The frame 19 is reinforced at each corner thereof by a corner framing 32, 33, 34 and 35 which serve to journal the rollers 36, 37, 38 and 39 on which the frame 19 moves over rails 6 and 7. To further strengthen the frame 19 we provide a transverse brace 40 and corner braces 41 and 42. The frame 19 is further strengthened and reinforced by an arrangement of lineal guide rails 43 and 44 which extend in spaced coplanar relation in paths parallel to the path of movement of the piston rod 55 as shown more clearly in Figs. 6 and 10. The frame 19 also carries corner brackets supported on corner frames 32, 33, 34 and 35 for journaling the pulleys 45, 46, 47 and 48 which guide the cables 21 and 22 forming part of the elevator system.

The hydraulic elevator system which is mounted on carriage 19 comprises an assembly including a piston rod 55 and a hydraulic cylinder 56 arranged on the carriage 19 in a lineal position which extends transversely of the longitudinally extending rails 6 and 7. The piston rod 55 supports a transverse header 53 which has a centrally arranged block 66 thereon for intercoupling the piston rod 55 with the header 53. A socket 54 in the header 53 provides for the entry of piston rod 55 into the header 53 through an aperture in the block 66 as represented more clearly in Fig. 10. The header 53 is provided with arms 53a and 53b at opposite ends thereof which terminate in sliding shoes 73 and 74 which engage the guide rails 43 and 44 for insuring the lineal displacement of the piston rod 55. The arms 53a and 53b also provide supporting means for the stub shafts 67 and 68 on which the pulleys 69, 70, 71 and 72 are journaled, as shown more clearly in Figs. 7, 10 and 11.

The oil cylinder 56 is braced with respect to the carriage 19 by a welded connection at 57 with the transverse brace 40. The oil cylinder 56 carries at opposite external positions on the sides thereof the stub shafts 58 and 59 shown more clearly in Figs. 6, *6a*, 8 and 8. These stub shafts 58 and 59 serve as journaling means for pulleys 60, 61, 62 and 63. The stub shafts 58 and 59 are braced at their ends by means of brace members 64 and 65 extending to cylinder 56 in a poition intermediate the position of support for stub shafts 58 and 59 on the cylinder 56 and the location of the support for the cylinder 56 on the frame member 30 of carriage 19.

The lift cables 21 and 22 which extend from the lift bars 23 over pulleys 45, 48 and 46, 47, respectively, are looped around the sets of pulleys supported on the cylinder 56 at 60, 61, 62 and 63, and the sets of pulleys associated with the header 53 at 69, 70, 71 and 72 and are adjustably anchored to a spreader 75 as shown more clearly in Figs. 6, *6a*, 9 and 14 at 76. The cables 21—22 are guided through slots in transverse brace 40 and over pulleys 78 and 79 carried by the shaped transverse brace 80. The spreader 75 is supported on the carriage 19 and serves as an anchor for the cables 21—22 which are guided over pulleys 81 in the course of their passage through pulleys 45—48.

The lengths of the lift cables as looped over the pulleys 60—63 and 69—72 are fixed so that the stroke of piston rod 55 in its lineal travel raises and lowers the load such as 27 within the required limits for loading or unloading the truck.

Movement of the carriage 19, longitudinally of the truck, is effected by hydraulic motor 82 mounted on vertical frame 3 and rotatably driving the sprocket 83 which meshes with sprocket chain 84 for driving sprocket wheel 85 on shaft 14. The inlet for the hydraulic fluid to hydraulic motor 82 is shown at 86 and the outlet at 87 extending from valve 88 shown more particularly in Fig. 6 which controls the flow of fluid from hydraulic pump 89. The valve 88 is controlled from a convenient position at one side of the truck by means of lever 90 which, when moved in one direction, operates the hydraulic motor 82 clockwise, and when moved to the opposite direction controls the hydraulic motor 82 counterclockwise, correspondingly moving the sprocket chains 17 and 18 for correspondingly shifting the position of carriage 19. The hydraulic pump 89 is driven from the truck engine represented at 91 and supplies not only the fluid power for driving the carriage 19 forward and backward on the truck, but also the fluid power for driving the elevator mechanism on the carriage 19. This is acaccomplished through hydraulic valve 92 which is controlled from one side of the truck by hand lever 93 for controlling the direction in which fluid flow is admitted to the cylinder 56 of the hydraulic elevator. Fluid to the elevator mechanism is controlled from valve 92 through the fluid inlet and discharge pipes 94 and 95 which extend to one side of the frame of the truck at the position 96 where connections are made through flexible rubber hose 97 and 98 which is looped flexibly upon itself at represented in Fig. 6 and supported by the telescopically slidable guiding mechanism 99 consisting of coacting slidable sections 100 and 101, where section 100 is hinged at 102 on the transverse frame member 29 while the section 101 is hinged at 103 on the chassis of the truck. Thus the carriage 19 is free to move longitudinally along rails 6 and 7 with the sections 100 and 101 telescopically lengthening and shortening each other and changing their angular position. An arrangement of supporting mutually pivoted links 104, 105 and 106 are provided, pivotally connected to each other and pivoted at 107 on sleeve 108 slidable over the guide section 100. One end of link 104 is pivoted to the guide section 100, while the other end of link 106 is pivoted to section 101. The links 104, 105 and 106 support vertical yokes 109 and 110 and 111 shown more clearly in Figs. 15 and 16, which serve as supports for the flexible hose 97 and 98 which is looped thereon. As the carriage 19 travels backward and forward the links 104, 105 and 106 change in position and the flexible hose 97 and 98 is variously straightened from the loosely curved positions which the hose normally occupies through the yokes 109, 110 and 111 for insuring full range of travel of carriage 19 in one end of the truck to a position beyond the loading and unloading end of the truck. The terminating ends of the hose 97 and 98 at the traveling carriage 19 connect to pipes 112 and 114 installed along the frame member 29 of carriage 19. Pipe 112 connects to the forward end of the cylinder 56 and pipe 114 connects to the rear end of cylinder 56 as shown in Figs. 6 and 6*a*. Depending upon the direction in which the fluid is admitted to pipes 94 and 95, by valve control by the angular movement of hand lever 93, the piston rod 55 of the elevator mechanism will be driven forwardly or backwardly, thereby operating the lift cables 21 and 22 to elevate or lower the load. An oil flow regulator 115 is connected with both hydraulic valves 88 and 92 in the hydraulic system of hydraulic pump 89 and is controllable through cable 116 through the operator's position for insuring the regulation of the hydraulic fluid such as oil in the hydraulic system whereby precision operation of both the carriage propelling mechanism and the loading and unloading mechanism is assured.

Ample bracing of all moving parts is provided for insuring the rigidity of the frame structure and the ability of the structure to lift and move heavy loads. For example, shaft 14 is mounted in anti-friction bracings in each side of the vertical frame 3 and the shaft is supported by intermediate journals 117 and 118 as shown in Fig. 5. The parallel rails 43 and 44 are braced by intermediate brace members indicated at 119 and 120 in Fig. 10. The vertical frames 3, 4 and 5 are braced with respect to each other by brace members which have been omitted for clarification of the drawings, except that we have illustrated braces 121, 122 and 123 in Fig. 3 for illustrating the manner of bracing the rails 6 and 7 with respect to the upper ends of the vertical frame members 3, 4 and 5.

By locating the hand levers 90 and 93 at the side of the truck as represented in Figs. 1, 3 and 18, the entire manipulation of the loading and unloading mechanism may be controlled by one operative.

Fig. 24 shows the layout of the cables 21 and 22 as they are threaded through the fixed pulleys 60, 61, 62 and 63 and through the displaceable pulleys 69, 70, 71 and 72. The cables 21 and 22 are threaded over the two sets of pulleys as illustrated and as the piston carried by piston rod 55 is moved out of hydraulic cylinder 56 the cables are lengthened between the axes of the pulleys. On the contrary, as the piston or piston rod 55 is retracted within cylinder 56 the effective lengths of the cables are shortened. These two conditions are illustrated in Figs. 6 and 6*a*, respectively, and the conditions are shown in the schematic views of Figs. 25 and 26.

In Fig. 25, for example, the piston has been displaced three feet out of the hydraulic cylinder 56, a condition in which the load is elevated; whereas in Fig. 26 the piston is displaced but two feet out of the cylinder 56, representing a condition where the load is lowered.

Fig. 27 diagrammatically shows the effect of the displacement of the sets of pulleys through a distance of one foot. It will be noted that there are four lengths of cable 22 between pulleys 62—63 and pulleys 71—72. When the centers of these pulleys are displaced one foot so that pulleys 71 and 72 occupy the positions 71' and 72' the change of one foot in the displacement produces a change of four feet with respect to elevation of the load. That is to say, the four lengths of cable 22 between fixed pulleys 62 and 63 and displaceable pulleys 71 and 72, where each length of cable equals one foot, produces a difference of four feet at the load end of the cable, as depicted in Fig. 27. Thus, where a load is to be let down to a ground level below the truck bed level, the piston is retracted a longer distance into the hydraulic cylinder 56, thereby paying out a greater length of cable at the load end. For intermediate levels the displacement of the piston is correspondingly regulated so that the load may be set down on the desired level or may be elevated from such desired level.

By crossing the cables 21 and 22 a symmetrical distribution of the raising and lowering forces is obtained. If these cables are not crossed the loads that are lifted or lowered are not balanced. The uncrossed cables exert a heavier load on one side of the cylinder 56 than on the other, often resulting in the bending of the piston rod 55. By crossing one cable from each side to their respective opposite sides as shown in Figs. 6, 6*a*, 7, 10, 14 and 24, this trouble is eliminated.

We have found the hydraulic control of the truck loading and unloading mechanism very practical and successful in operation, and while we have described our invention in certain of its preferred embodiments we realize that modifications may be made and we desire that it be understood that no limitations upon our invention are intended other than may be imposed by the scope of the appended claims.

What we claim as new and desire to secure by Letters Patent of the United States is as follows:

1. Loading and unloading apparatus comprising a load guiding trackway, a carriage movable longitudinally of said trackway, hydraulic propelling mechanism for moving said carriage in a horizontal plane longitudinally of said trackway, a hydraulic lift mechanism mounted on said carriage, means connected with said carriage and extendible and collapsible longitudinally of said trackway in a plane substantially parallel with the horizontal plane of movement of said carriage, means carried by the aforesaid means for conveying fluid power to said hydraulic lift mechanism and means adjacent said trackway for selectively controlling both said hydraulic propelling mechanism and said hydraulic lift mechanism for elevating and maneuvering a load supported by said hydraulic lift mechanism with respect to said trackway.

2. Loading and unloading apparatus as set forth in claim 1 wherein said means connected with said carriage and extendible and collapsible longitudinally of said trackway consists of a telescopically slidable muti-section member operating in a horizontal plane and forming an adjustable support for the means for conveying fluid power to said hydraulic lift mechanism.

3. Loading and unloading apparatus as set forth in clain 1 wherein said means connected with the carriage and extendible and collapsible longitudinally of the trackway consists of a telescopically slidable multi-section member and a pair of levers having a hinged connection therebetween and individually pivotally connected with one of the members remote from said hinged connection, said levers forming a support for said means for conveying fluid power to said hydraulic lift mechanism.

4. Loading and unloading apparatus as set forth in claim 1 wherein said hydraulic lift comprises a lineally extending hydraulic cylinder mounted at one end thereof on said carriage and a coacting lineally slidable piston rod, a header mounted adjacent the external end of said piston rod, a pair of stub shafts mounted on opposite sides of said cylinder adjacent the supported end thereof, means for slidably supporting said header throughout the lineal path of movement thereof, lineally aligned pulleys journaled on said stub shafts and on said header, and a load supporting cable system operative over said pulleys and connected to said header whereby movement of said header operates to raise or lower a load supported by said cable system.

5. A load elevating mechanism for mobile units comprising a carrier mounted for movement transversely of a horizontally disposed supporting rail system, a hydraulic piston and cylinder assembly disposed on said carrier and extending in a horizontal plane offset from the plane of said rail system, said hydraulic piston being reciprocative in a path normal to the direction of movement of said carrier, a system of guide pulleys, a load supporting cable system connected at one end to a load and threaded through said system of guide pulleys and connected at the other end to said hydraulic piston whereby movement of said piston operates to raise or lower the load connected to said cable system, an assembly of telescopically slidable members movable in a plane offset from the plane of said hydraulic piston and cylinder assembly and above the plane of said rail system, one of said slidable members at one end of said assembly of slidable members being connected with said carrier and another of said members at the other end of said assembly of slidable members being connected to a position fixed with respect to said rail system, and a hose system supported by said assembly of slidable members for conveying hydraulic presure to said hydraulic piston and cylinder assembly independently of the movement of said carrier with respect to said rail system.

6. A load elevating mechanism for mobile units comprising a carrier mounted for movement transversely of a horizontally disposed supporting rail system, a hydraulic piston and cylinder assembly disposed on said carrier and extending in a horizontal plane offset from the plane of said rail system, said hydraulic piston being reciprocative in a path normal to the direction of movement of said carrier, a guide pulley assembly mounted on said cylinder, an aligned guide pulley assembly connected with said hydraulic piston and a cable system looped around said guide pulley assemblies and connected to support a load whereby projection of said hydraulic piston with respect to said cylinder moves said cable system for raising the load and retraction of said hydraulic piston into said cylinder moves said cable system to lower the load, an assembly of telescopically slidable members movable in a plane offset from the plane of said hydraulic piston cylinder assembly and above the plane of said rail system, one of said slidable members at one end of said assembly of slidable members being connected with said carrier and another of said members at the other end of said assembly of slidable members being connected to a position fixed with respect to said rail system, a series of pivotally connected links carried by said assembly of telescopically slidable members and extending generally transversely thereof, and a hose system supported by said links and by said assembly of slidable members for conveying hydraulic pressure to said hydraulic piston and cylinder assembly independently of the movement of said carrier with respect to said rail system.

References Cited in the file of this patent

UNITED STATES PATENTS

| | | |
|---|---|---|
| 457,441 | Naylor | Aug. 11, 1891 |
| 922,208 | Suess | May 18, 1909 |
| 1,598,273 | Fitch | Aug. 31, 1926 |
| 2,408,284 | Anthony | Sept. 24, 1946 |
| 2,478,094 | Gelbman | Aug. 2, 1949 |
| 2,557,253 | Belden | June 19, 1951 |
| 2,605,914 | Hala | Aug. 5, 1952 |
| 2,701,655 | Crile | Feb. 8, 1955 |